United States Patent
Shen et al.

(10) Patent No.: US 11,674,926 B2
(45) Date of Patent: Jun. 13, 2023

(54) MAGNETOACOUSTIC EMISSION DETECTION METHOD FOR FATIGUE DAMAGE OF FERROMAGNETIC METAL COMPONENT

(71) Applicant: China Special Equipment Inspection and Research Institute, Beijing (CN)

(72) Inventors: Gongtian Shen, Beijing (CN); Yongna Shen, Beijing (CN); Wenjun Zhang, Beijing (CN)

(73) Assignee: China Special Equipment Inspection and Research Institute, Beijing (CN)

( * ) Notice: Subject to any disclaimer, the term of this patent is extended or adjusted under 35 U.S.C. 154(b) by 163 days.

(21) Appl. No.: 17/333,148

(22) Filed: May 28, 2021

(65) Prior Publication Data
US 2021/0372967 A1    Dec. 2, 2021

(30) Foreign Application Priority Data
May 28, 2020  (CN) .......................... 202010471484.3

(51) Int. Cl.
*G01B 7/24*     (2006.01)
*G01N 27/72*    (2006.01)

(52) U.S. Cl.
CPC .............. *G01N 27/725* (2013.01); *G01B 7/24* (2013.01)

(58) Field of Classification Search
CPC ................ G01R 33/00; G01R 33/0035; G01R 33/0023; G01R 33/0017; G01R 31/3191;
(Continued)

(56) References Cited

U.S. PATENT DOCUMENTS

| 4,523,473 A * | 6/1985 | Chamuel ............ G01N 29/2431 73/583 |
| 9,030,197 B1 * | 5/2015 | Meske ................. G01R 15/185 324/225 |
| 2004/0221652 A1 * | 11/2004 | Flora ................... G01N 29/2412 73/578 |

* cited by examiner

Primary Examiner — Jermele M Hollington
Assistant Examiner — Taqi R Nasir
(74) Attorney, Agent, or Firm — Fox Rothschild LLP

(57) ABSTRACT

A magneto acoustic emission detection method for fatigue damage of ferromagnetic metal components: First, generating an excitation magnetic field by using a sine wave voltage signal, gradually increasing a loading voltage until a magneto acoustic emission signal of a bimodal envelope with an obvious tail peak is acquired, and taking a corresponding voltage peak value as a reference voltage; second, generating an excitation magnetic field by using a square wave voltage signal equal to or higher than a reference voltage, and acquiring a magneto acoustic emission signal with a T-shaped envelope; and third, calculating the average value of peak-to-peak values of the magneto acoustic emission signal in multiple periods to serve as a characteristic parameter, and enabling the characteristic parameter to have inflection point change along with the development of the initiation and expansion of the fatigue crack, and giving a timely early warning for the failure of the component.

(Continued)

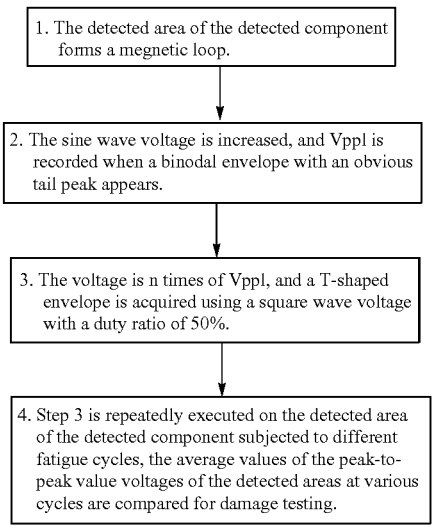
5 Claims, 6 Drawing Sheets
(58) Field of Classification Search
CPC .......... G01B 7/004; G01B 7/24; G01C 17/38; G06F 3/017; G06F 3/0346; G06F 3/012; G01N 27/725
See application file for complete search history.

MAGNETOACOUSTIC EMISSION DETECTION METHOD FOR FATIGUE DAMAGE OF FERROMAGNETIC METAL COMPONENT

CROSS REFERENCE TO RELATED APPLICATION(S)

This patent application claims the benefit and priority of Chinese Patent Application No. 202010471484.3, filed on May 28, 2020, the disclosure of which is incorporated by reference herein in its entirety as part of the present application.

TECHNICAL FIELD

The present disclosure belongs to the technical field of nondestructive testing of material damage, and particularly relates to a magneto acoustic emission detection method for fatigue damage of ferromagnetic metal components.

BACKGROUND ART

The fatigue life of metal components subjected to cyclic loading for a long time can be divided into three stages: (1) the first stage is the fatigue hardening or softening stage, in which the microstructure of the material changes as a whole, eventually forming stress-strain concentration areas and resulting in fatigue damage; (2) the second stage is the crack initiation stage, in which the crack length is usually not larger than the grain size (10 μm-100 μm); (3) the third stage is the crack expansion stage, which is divided into the stable crack expansion stage I and the rapid crack expansion stage II, in which the stable crack expansion stage I refers to microcracks expanding along the original direction, and the rapid fatigue crack expansion stage II refers to microcracks forming main cracks and expanding along the direction perpendicular to the maximum principal tensile stress. Once the rapid fatigue crack expansion stage II appears, the failure of components often occurs quickly. Therefore, it is of great significance to determine the initial time of the rapid fatigue crack expansion stage II and give an early warning to ensure the safe operation of components.

Traditional nondestructive testing techniques, such as magnetic powder, eddy current and permeation, can only detect macroscopic or visible fatigue cracks, that is, fatigue cracks in stage II rapidly expanded to cracks with a certain length. Magneto acoustic emission (MAE) refers to the phenomenon that ferromagnetic metal materials produce acoustic emission due to the change of the magnetic domain structure under the action of the alternating magnetic field. The MAE signal is very sensitive to the microstructure and stress state of ferromagnetic metal materials. At present, the alternating magnetic field used in MAE detection is often excited by a current or voltage signal of a sine wave or a triangular wave with symmetry of 50%, and the maximum intensity of the alternating magnetic field is determined by the amplitude and frequency of current or voltage signals. Hou Binglin et al. (Hou Binglin, Zhou Jianping, Peng Xiang, et al. APPLICATION OF MAGNETO ACOUSTIC EMISSION IN NONDESTRUCTIVE TESTING OF RAIL PERFORMANCE [J]. Journal of Experimental Mechanics, 1998 (01): 99-105), conduct MAE test on U74 rail steel with different fatigue cycles using sine wave voltage signals, in which the results show that with the increase of the number of fatigue cycles, the root mean square voltage of MAE signals first increases and then monotonously decreases, and reaches the maximum value at about 20% of the fatigue life. The larger the magnetic field intensity Hmax is, the more obvious the above rule is (FIG. 1). However, it cannot distinguish the fatigue crack steady expansion stage I from the rapid expansion stage II. Similarly, the inventor of the present application uses sine wave voltage signals to excite Q235 steel to acquire the change of the root mean square voltage of MAE signals with the fatigue cycle, and also obtains a similar law (FIG. 2). The fatigue crack steady expansion stage I cannot be distinguished from the rapid expansion stage II.

SUMMARY

This patent document provides a novel approach to the detection of the fatigue crack stable expansion stage I and the rapid expansion stage II. By studying the relationship between the amplitude and waveform of excitation signals and the intensity of the alternating magnetic field, the inventor analyzes the influence of the alternating magnetic field on the change rule of MAE with fatigue damage. By analyzing the change of stress state and microstructure state of materials or components when fatigue crack changes from the stable expansion stage I to the rapid expansion stage II, it is found that the process is accompanied by stress release and the formation of discontinuity of the material surface. (1) Stress release causes the MAE signal intensity to increase (the MAE signal intensity is negatively correlated with stress). (2) Discontinuity of the material surface causes magnetization of material to decrease, and then the number of irreversible magnetic domain walls decreases, which leads to decrease of the MAE signal intensity, that is, the change of the MAE signal intensity is closely related to the magnetic field intensity of material. The changing trend of stress release is the key to the stable expansion of microcracks to the rapid expansion of macroscopic main cracks. Therefore, on the basis of analyzing the influencing factors of the MAE signal intensity, the inventor proposes the detection method described in the present disclosure based on the idea of improving the alternating magnetic field intensity in order to solve the problem that the fatigue crack stable expansion stage I and the rapid expansion stage II cannot be identified.

In order to detect the initial time of the rapid fatigue crack expansion stage II, the present disclosure provides a magneto acoustic emission detection method for fatigue damage of ferromagnetic metal components, specifically comprising:

first, placing a U-shaped electromagnetic yoke and an acoustic emission sensor in a position in a detected area of a tested ferromagnetic metal component which is not subjected to fatigue load, wherein the magnetic yoke and the component form a magnetic loop, and the acoustic emission sensor is used for collecting magneto acoustic emission signals;

wherein a subsequent detection step uses square wave excitation on the basis of acquiring a sine wave reference voltage, so as to obtain a stable and effective excitation source to ensure that the magnetization intensity inside the material of the tested component remains saturated in the fatigue process, and the voltage of the peak-to-peak values of the MAE signal of the finally acquired T-shaped envelope effectively indicates the initial time of rapid crack expansion in the stage II along with the inflection point change of the fatigue cycle;

wherein the detection step comprises:

(1) acquiring a reference voltage Vpp1 using a sine wave excitation magnetic field, comprising: loading a sine wave voltage signal on a coil of the U-shaped electromagnetic yoke, and adjusting the peak-to-peak value of the loaded signal from small to large until the time-domain waveform of the acquired magneto acoustic emission signal has a bimodal envelope with an obvious tail peak, wherein at this time, the voltage peak-to-peak value of the loaded signal is denoted as a reference voltage Vpp1;

(2) square wave excitation of Vpp1 based on a reference voltage, comprising:

keeping the signal frequency unchanged, setting the voltage peak-to-peak value of the signal to be n times of Vpp1, where n≥1, and generating an excitation magnetic field using a square wave voltage signal with a duty ratio of 50%, wherein at this time, the time-domain waveform of the acquired magneto acoustic emission signal has a T-shaped envelope;

(3) signal filtering, comprising:

filtering the magneto acoustic emission signals of M magnetization periods, extracting the peak-to-peak value voltage of the magneto acoustic emission signals excited by the square wave voltage, and calculating the average value of the peak-to-peak value voltage in the M magnetization periods;

(4) fatigue monitoring and judging the appearance of fatigue crack expansion in the stage II, comprising:

using the square wave voltage signal with the frequency and the voltage peak-to-peak value in step (2) to detect the same area of the tested ferromagnetic metal component which is subjected to different fatigue cycles, and analyzing the curve of the average value of the peak-to-peak value voltage of the magneto acoustic emission signal changing with the detection cycle to judge whether the tested component starts rapid fatigue crack expansion stage II.

Further, the average value of the peak-to-peak value voltage of the magneto acoustic emission signals of M magnetization cycles is taken as a characteristic parameter, and the inflection point of the curve of the characteristic parameter changing with the fatigue cycle after continuously monotonically decreasing is the initial time of the rapid fatigue crack expansion stage II:

(4.1) with the increase of the fatigue cycle, the peak-to-peak value voltage of the acquired magneto acoustic emission signal first fluctuates and then monotonously decreases, indicating that the component does not have the rapid fatigue crack expansion stage II; or (4.2) with the increase of the fatigue cycle, the peak-to-peak value voltage of the acquired magneto acoustic emission signal changes from monotonically decreasing to gradually increasing, indicating the component has the rapid fatigue crack expansion stage II.

Further, in step (2), n ranges from 1 to $n_1$, where $n_1$=the maximum output voltage of the signal generator providing the voltage signal/Vpp1.

Further, in step (3), the M is greater than or equal to 20.

Further, the U-shaped electromagnetic yoke is replaceable by a coil, and at this time, the detected area is placed inside the coil.

Compared with the prior art, the present disclosure has the following beneficial effects.

(1) In the existing MAE detection process, only the excitation signal of a sine wave or a triangular wave with symmetry of 50% is used, and it can only be found that with the increase of number of fatigue cycles, the root mean square voltage of the MAE signal first increases and then monotonously decreases. The change of fatigue microcrack expansion cannot be identified, thus failing to give an early warning to component failure. According to the present disclosure, a square wave voltage signal based on a reference voltage adjusted by a sine wave is used as an excitation signal. AT-shaped envelope signal is acquired by square wave excitation on the basis that the reference voltage ensures strong alternating magnetic field intensity. The signal firstly increases and then monotonously decreases with the increase of the number of fatigue cycles, and then an inflexion point changes along with the continuous development of fatigue cracks, so that the development inflexion point of stable expansion and rapid expansion of fatigue microcracks can be identified, thereby giving a timely early warning for the failure of the component.

(2) In the existing MAE monitoring process, the excitation signal of a sine wave or a triangular wave with symmetry of 50% is used. Under the noise interference of fatigue monitoring on the service site of components, the waveform envelope of the acquired MAE signal changes and fluctuates. The common signal is a hump envelope or an envelope overlap, and the root mean square voltage of the signal is greatly affected by the environment, so that it is difficult to ensure the reliability and accuracy of judging and identifying fatigue damage based on this characteristic parameter. According to the present disclosure, the square wave voltage signal is used as the excitation signal, the acquired MAE signal has a T-shaped envelope, the waveform of the signal is clear and legible, on the basis that the reference voltage ensures enough magnetic field intensity, the anti-noise capacity of MAE is greatly improved, and the peak-to-peak value voltage is extracted accurately and conveniently, so that the fatigue monitoring realizes the engineering application of MAE technology, and the detection result is stable and reliable.

DETAILED DESCRIPTION OF THE EMBODIMENTS

The present disclosure will be further explained with reference to the attached drawings and specific embodiments.

Figure 1:
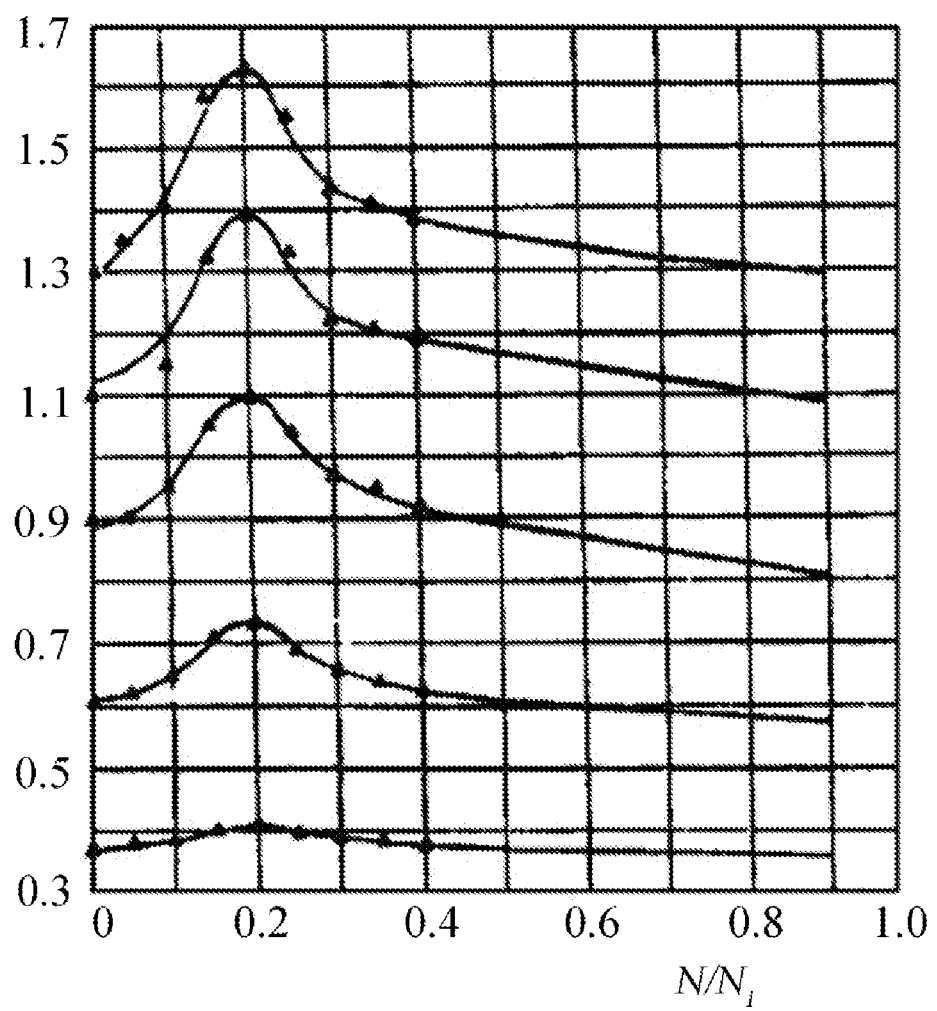
FIG. 1 is a VRMS-N/Nf curve under different excitation voltages in the existing MAE detection method.
Figure 2:
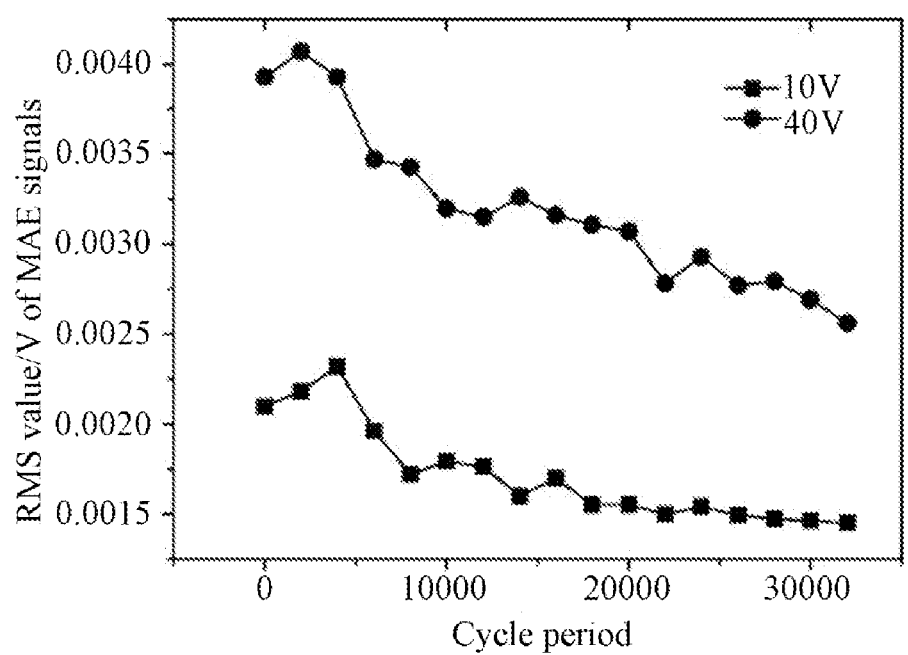
FIG. 2 is the change of RMS value of the MAE signal with the fatigue cycle under different excitation voltages of a sine wave.
Figure 3:
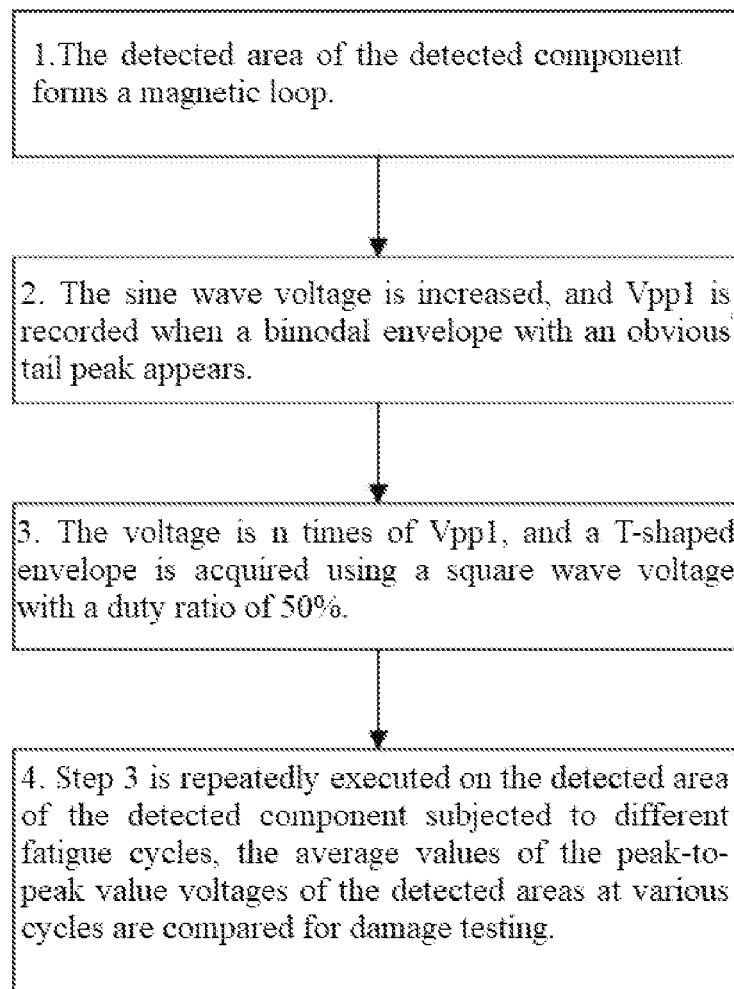
FIG. 3 is a block diagram of the steps of the magneto acoustic emission detection method for fatigue damage of ferromagnetic metal components according to the present disclosure.

Refer to FIG. 3 for the block diagram of the steps of the detection method according to the present disclosure. The steps are as follows.

1) The self-made U-shaped electromagnetic yoke and the acoustic emission sensor are placed in a relatively fixed position in the central area of Q235 steel components without being subjected to fatigue loading.

2) A periodic sine wave voltage signal is loaded to the coil of the U-shaped electromagnetic yoke. The frequency of the signal is 20 Hz, wherein the voltage signal is generated by a function generator, amplified by a power amplifier 10 times and then input to the coil. Because MAE signals are generated under the alternating magnetic field excited by sine wave voltage signals, Q235 steel components generate two identical MAE signals in one magnetization cycle, that is, the frequency of MAE signals is twice the frequency of the alternating magnetic field.

Figure 4:
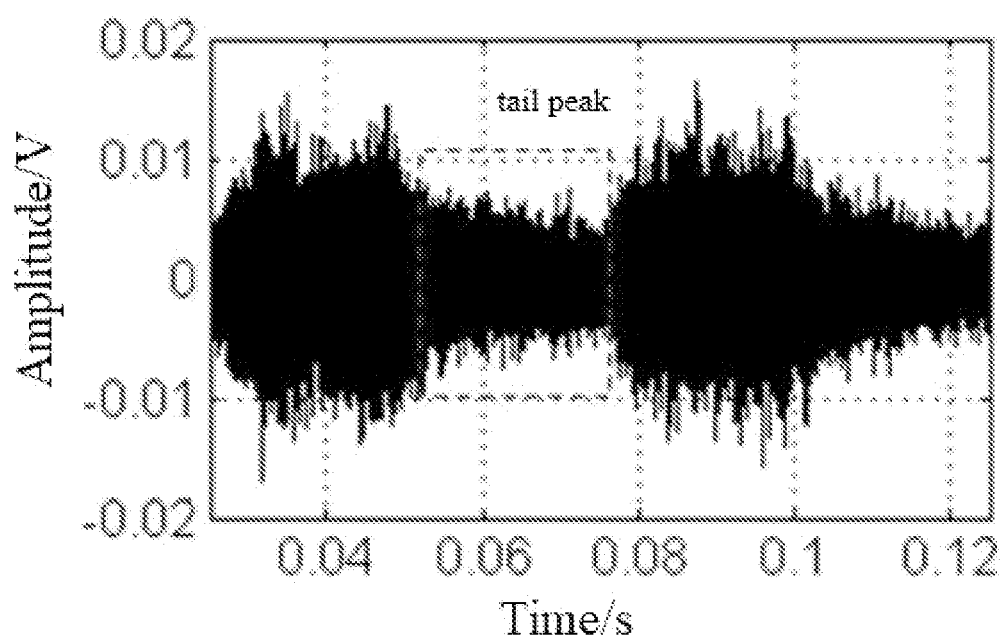
FIG. 4 is an MAE signal diagram of a time-domain waveform having a bimodal envelope with obvious tail peaks in a magnetization period.

With the function generator, the peak-to-peak value of the output voltage signal is increased from 0.5 Vpp with a gradient of 0.5 Vpp. When the peak-to-peak value is increased to 4 Vpp, a magneto acoustic emission signal of a bimodal envelope with obvious tail peaks in the time-domain waveform as shown in FIG. 4 can be acquired. At this time, the dynamic hysteresis loop of the material tends to be saturated, indicating that the maximum alternating magnetic field intensity Hmax generated by the voltage signal is close to the saturation magnetization of the material.

When the magnetic field is a constant magnetic field and the magnetic field intensity is greater than or equal to the saturation magnetization of the material, the influence of cracks or surface discontinuities on the magnetization of the material is ignorable. Compared with the constant magnetic field with the same intensity, the magnetization ability of the alternating magnetic field excited by the sine wave voltage is relatively weak, because when the magnetic field is excited by a sine wave voltage signal, the higher the signal frequency is under a certain voltage, the smaller the alternating magnetic field intensity is. The voltage platform of the square wave voltage signal is equivalent to the sine wave voltage signal with infinite frequency. Therefore, the use of the square wave voltage signal can effectively improve the alternating magnetic field intensity and magnetization ability of materials. Therefore, on the basis of the alternating magnetic field intensity corresponding to 4 Vpp voltage, Hmax is further improved in the form of square wave excitation, which will reduce or eliminate the influence of surface discontinuity on MAE signal intensity.

Figure 5:
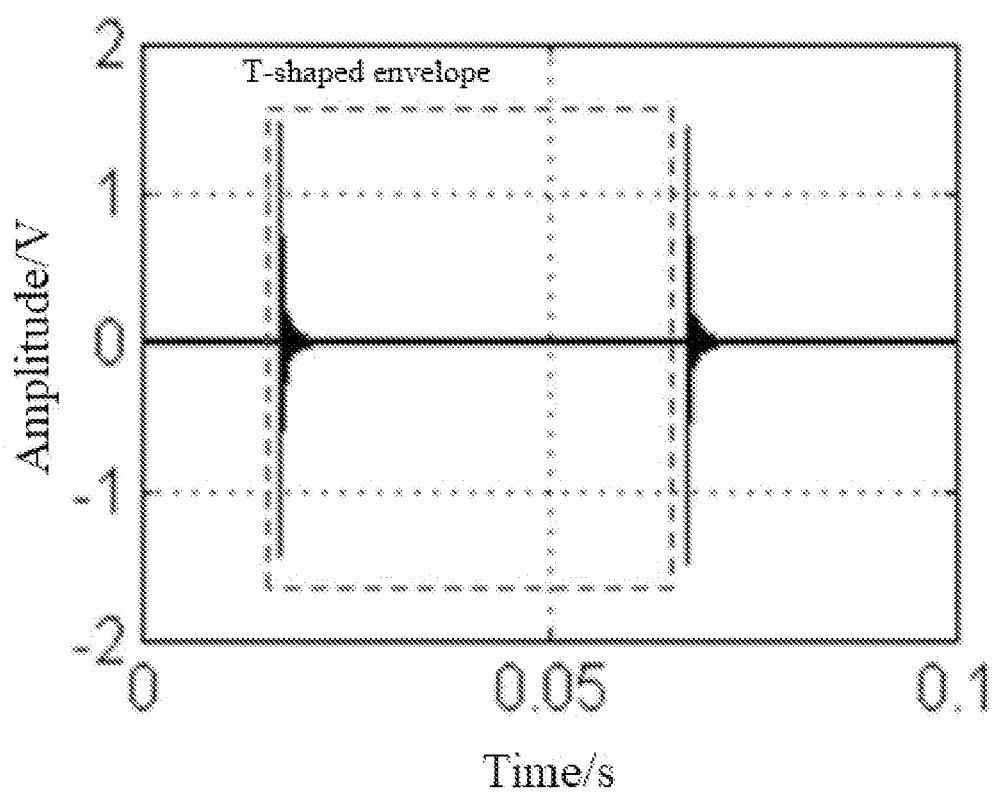
FIG. 5 is an MAE signal diagram of a time-domain waveform having a T-shaped envelope in a magnetization period.

3) The sine wave voltage signal in 2) is changed into a square wave voltage signal with a duty ratio of 50%, the frequency of the signal is kept at 20 Hz, and the peak-to-peak value is set at 4 Vpp. At this time, the acquired MAE signal has a T-shaped envelope, as shown in FIG. 5.

4) The MAE signals of 25 magnetization periods are filtered, and then the characteristic parameters of the MAE signals, i.e. peak-to-peak value voltages, are extracted, and the average values of the peak voltages of the MAE signals in these periods are acquired respectively.

The specific method is as follow: first, the components with frequency low than 20 kHz are filtered out, the peak voltage of waveform signals in one magnetization period is acquired, and then the average value of peak-to-peak value voltages of multiple magnetization periods is acquired.

Figure 6:
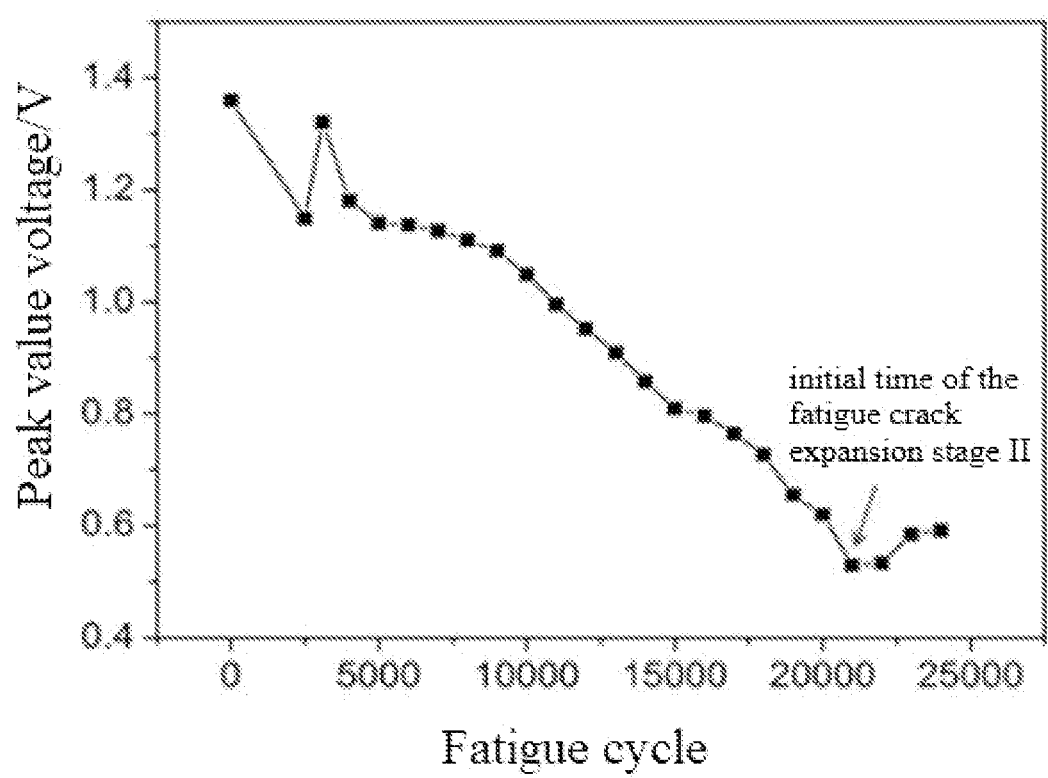
FIG. 6 is a curve of the peak-to-peak value voltage of an MAE signal of Q235 varying with the fatigue cycle.

5) The MAE signals of Q235 steel components subjected to different fatigue cycles are collected by using the voltage signals in step 3), and are analyzed in step 4), so as to acquire the average value of the peak-to-peak value voltages of MAE signals of different fatigue cycles in 25 magnetization cycles, as shown in FIG. 6.

For ferromagnetic metal materials, the irreversible magnetization process is mainly the irreversible displacement of magnetic domain walls and the generation and annihilation of magnetic domain walls. The intensity of MAE signals is closely related to the number and displacement of irreversibly displaced domain walls. In the fatigue stage I, dislocations in materials proliferate rapidly, and their morphology develops from dispersed dislocations to dislocation junctions and dislocation envelopes, and finally forms "a resident slip band". The formation of a dislocation junction and a dislocation envelope, on the one hand, increases the number of irreversibly displaced magnetic domain walls as pinning points of magnetic domains, and then enhances MAE signals; on the other hand, the irreversible displacement of domain walls decreases, and thus the MAE signal intensity is reduced. The combined action of the two aspects causes the MAE signal intensity to fluctuate. In the fatigue stage II, the initiation of microcracks breaks the original magnetic domain structure, reduces the irreversible displacement of the magnetic domain wall, and further reduces the MAE signal intensity. In the fatigue stage III, with the rapid crack expansion of the fatigue stage II, on the one hand, the stress is released to a certain extent, which leads to an increase in the intensity of MAE signals, but on the other hand, the crack expansion strain leads to the discontinuity of the surface formed by components, so that the magnetization of materials decreases, which in turn leads to a decrease in the number of irreversibly displaced magnetic domain walls, so that the intensity of MAE signals decreases. Therefore, in the fatigue stage III, the change of MAE signal intensity is determined by stress release and discontinuity of the material surface. When the applied magnetic field is a constant magnetic field and the magnetic field intensity is greater than or equal to the saturation magnetization of the material, the influence of discontinuity on the magnetization of the material is ignorable. Therefore, in order to overcome the influence of surface discontinuity on excitation magnetization and make the MAE change resulted from stress release appear, the inventor proposes that by increasing Hmax, the influence of discontinuity on the magnetization of material is weakened or eliminated when the component surface is discontinuous, so that the increasing effect of stress release on MAE intensity is not concealed by the influence of surface discontinuity. The signal characteristic value would appear with the "inflection point" of the fatigue cycle.

The acquisition of a reference voltage first ensures the saturation magnetization of materials. On this basis, square wave excitation provides a clear and legible T-shaped envelope on one hand, and on the other hand, the voltage platform of a square wave voltage signal is equivalent to a sine wave voltage signal with infinite frequency, and its average voltage is higher than that of a sine wave, which substantially further improves the intensity of the excitation magnetic field. Therefore, the sine wave reference voltage combined with square wave excitation provided by the present disclosure ensures that when subsequent surface discontinuity occurs, the magnetization inside the material is still saturated, so that the MAE signal finally acquired by the present disclosure reflects the change of stress release when the fatigue crack develops from stable expansion in the stage I to rapid expansion in the stage II. That is, the present disclosure acquires a stable and effective excitation source by combining a sine wave and a square wave, so that the peak-to-peak value voltage of the T-shaped envelope signal can be used as the analyzed characteristic parameter to effectively indicate the initial time of rapid crack expansion in the stage II.

The above embodiment proves the effectiveness of the present disclosure. That is, by comparing the average value of the peak-to-peak value voltages of the magneto acoustic emission signals of the parts to be detected with different fatigue cycles, the present disclosure can be intuitively and conveniently used for analyzing the fatigue damage degree of the area to be detected, and ensures the reliability and effectiveness of the detection result.

The above embodiments are preferred embodiments of the present disclosure, but the embodiments of the present disclosure are not limited by the above embodiments. Any other changes, modifications, substitutions, combinations and/or simplifications made without departing from the spirit and principles of the present disclosure shall be regarded as equivalent alternatives and shall be included in the scope of protection of the present disclosure.

What is claimed is:

1. A magneto acoustic emission detection method for fatigue damage of ferromagnetic metal components, specifically comprising:

placing a U-shaped electromagnetic yoke and an acoustic emission sensor in a position in a detected area of a tested ferromagnetic metal component which is not subjected to fatigue load, wherein the magnetic yoke and the component form a magnetic loop, and the acoustic emission sensor is used for collecting magneto acoustic emission signals;

wherein a subsequent detection step uses square wave excitation on the basis of acquiring a sine wave reference voltage, so as to obtain a stable and effective excitation source to ensure that the magnetization intensity inside the material of the tested component remains saturated in the fatigue process, and the voltage of the peak-to-peak values of the MAE signal of the finally acquired T-shaped envelope effectively indicates the initial time of rapid crack expansion in the stage II along with the inflection point change of the fatigue cycle;

wherein the detection step comprises:

(1) acquiring a reference voltage Vpp1 using a sine wave excitation magnetic field, comprising:

loading a sine wave voltage signal on a coil of the U-shaped electromagnetic yoke, and adjusting the peak-to-peak value of the loaded signal from small to large until the time-domain waveform of the acquired magneto acoustic emission signal has a bimodal envelope with an obvious tail peak, wherein at this time, the voltage peak-to-peak value of the loaded signal is denoted as a reference voltage Vpp1;

(2) square wave excitation of Vpp1 based on a reference voltage, comprising:

keeping the signal frequency unchanged, setting the voltage peak-to-peak value of the signal to be n times of Vpp1, where n≥1, and generating an excitation magnetic field using a square wave voltage signal with a duty ratio of 50%, wherein at this time, the time-domain waveform of the acquired magneto acoustic emission signal has a T-shaped envelope;

(3) signal filtering, comprising:

filtering the magneto acoustic emission signals of M magnetization periods, extracting the peak-to-peak value voltage of the magneto acoustic emission signals excited by the square wave voltage, and calculating the average value of the peak-to-peak value voltage in the M magnetization periods;

(4) fatigue monitoring and judging the appearance of fatigue crack expansion in the stage II, comprising:

using the square wave voltage signal with the frequency and the voltage peak-to-peak value in step (2) to detect the same area of the tested ferromagnetic metal component which is subjected to different fatigue cycles, and analyzing the curve of the average value of the peak-to-peak value voltage of the magneto acoustic emission signal changing with the detection cycle to judge whether the tested component starts rapid fatigue crack expansion stage II.

2. The magneto acoustic emission detection method for fatigue damage of ferromagnetic metal components according to claim 1, wherein in step (4), the average value of the peak-to-peak value voltage of the magneto acoustic emission signals of M magnetization cycles is taken as a characteristic parameter, and the inflection point of the curve of the characteristic parameter changing with the fatigue cycle after continuously monotonically decreasing is the initial time of the rapid fatigue crack expansion stage II:

(4.1) with the increase of the fatigue cycle, the peak-to-peak value voltage of the acquired magneto acoustic emission signal first fluctuates and then monotonously decreases, indicating that the component does not have the rapid fatigue crack expansion stage II; or (4.2) with the increase of the fatigue cycle, the peak-to-peak value voltage of the acquired magneto acoustic emission signal changes from monotonically decreasing to gradually increasing, indicating that the component has the rapid fatigue crack expansion stage II.

3. The magneto acoustic emission detection method for fatigue damage of ferromagnetic metal components according to claim 1, wherein in step (2), n ranges from 1 to $n_1$, where $n_1$=the maximum output voltage of the signal generator providing the voltage signal/Vpp1.

4. The magneto acoustic emission detection method for fatigue damage of ferromagnetic metal components according to claim 1, wherein in step (3), the M is greater than or equal to 20.

5. The magneto acoustic emission detection method for fatigue damage of ferromagnetic metal components according to claim 1, wherein the U-shaped electromagnetic yoke is replaceable by a coil, and at this time, the detected area is placed inside the coil.

* * * * *